(12) United States Patent
Cecchi et al.

(10) Patent No.: US 6,549,971 B1
(45) Date of Patent: Apr. 15, 2003

(54) CASCADED DIFFERENTIAL RECEIVER CIRCUIT

(75) Inventors: Delbert Raymond Cecchi, Rochester, MN (US); Daniel Mark Dreps, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,735

(22) Filed: Aug. 26, 1999

(51) Int. Cl.$^7$ ................................................ G06F 1/00
(52) U.S. Cl. ........................ 710/306; 710/105; 330/301; 327/55
(58) Field of Search ................................ 710/107, 105, 710/106, 110, 305–307, 314–315; 330/69, 260, 258, 252, 295, 301, 9; 348/528, 521–522; 327/52–55, 254–255

(56) References Cited

U.S. PATENT DOCUMENTS

| | | | | |
|---|---|---|---|---|
| 4,595,923 A | * | 6/1986 | McFarland, Jr. | 340/825.52 |
| 4,958,133 A | | 9/1990 | Bazes | 330/253 |
| 5,057,788 A | * | 10/1991 | Ushida et al. | 330/261 |
| 5,489,946 A | * | 2/1996 | Kommrusch et al. | 348/528 |
| 5,506,537 A | * | 4/1996 | Kimura | 327/351 |
| 5,696,726 A | * | 12/1997 | Tsukikawa | 365/205 |
| 5,815,020 A | * | 9/1998 | Allen et al. | 327/255 |
| 5,977,827 A | * | 11/1999 | Dick | 330/252 |
| 5,990,737 A | * | 11/1999 | Czarnul et al. | 330/69 |
| 6,243,776 B1 | * | 6/2001 | Lattimore et al. | 710/104 |
| 6,255,859 B1 | * | 7/2001 | Haq | 327/14 |
| 6,377,084 B1 | * | 4/2002 | Forbes | 327/55 |

* cited by examiner

*Primary Examiner*—Glenn A. Auve
*Assistant Examiner*—Raymond N Phan
(74) *Attorney, Agent, or Firm*—Joseph P. Lally; Tom Tyson; Volel Emile (57) ABSTRACT

A differential receiver circuit including first, second, and third amplification stages. The first amplification stage is configured to receive a differential input signal and to produce a single ended first output signal responsive to the differential input signal. The second amplification stage is connected in parallel with the first stage and configured to receive the differential input signal and to produce a second output signal responsive to the differential input signal. The third amplification stage is configured to receive the first and second output signals and to produce a single ended third output signal indicative of the differential in the first and second output signals. In one embodiment the differential receiver circuit further includes an inhibit circuit configured receive an inhibit control signal and to drive the p-channel devices gated to the first amplifier node and the n-channel devices gated to the second amplifier node to cutoff when the inhibit control signal is in a specified inhibit state. The inhibit circuit is preferably further configured to provide a low impedance path between the first amplifier node, the second amplifier node, and the feedback node when the inhibit control signal is in a specified functional state.

21 Claims, 4 Drawing Sheets

FIG.4

CASCADED DIFFERENTIAL RECEIVER CIRCUIT

BACKGROUND

1. Field of the Present Invention

The present invention generally relates to the field of data processing systems and more particularly to systems for reliably communicating data over a transmission medium.

2. History of Related Art

The ability to reliably convert low voltage differential signals to CMOS levels has received significant attention with the increasing prevalence of networked and other types of systems in which data may reside in a permanent storage facility physically displaced from the system's processor or processors by a significant distance (e.g., one meter or more). In such a system, information is typically communicated between the processor and storage system over a transmission medium such as copper wiring. Reliable communication of information at high speeds over a transmission medium of any considerable length is difficult to achieve. Capacitive and resistive loss characteristics inherent in any transmission medium degrade the original signal in proportion to the length of the transmission medium. If the signal attenuation due to these transmission losses exceeds roughly ⅓ of the original signal, it is generally considered advisable to utilize a differential signal to communicate the information. Transmission of information using differential signals compensates for ground level shifts between the components at either end of the transmission medium and signal attenuation along the medium. As supply voltages decrease and data rates increase however, the capabilities of conventional differential receiver circuits utilized to transform an incoming differential signal into a single ended CMOS compatible signal are reaching their limits. Minor variations or distortions introduced into even the most stringently matched transmission media and receiver circuit can affect the timing of data transitions by as much as 10% of the pulse width. Therefore, it is highly desirable to implement a differential signal receiver circuit that extends the capabilities of exiting circuits. It is further desirable if the implemented solution does not significantly increase the cost or complexity of the system and does not otherwise negatively affect the overall system performance.

SUMMARY OF THE INVENTION

The problems identified above are in large part addressed by a differential receiver circuit and an associated I/O device and data processing system for reliably producing single ended CMOS compatible signals in response to differential signals received from a transmission medium. Broadly speaking, the differential receiver circuit includes first, second, and third amplification stages. The first amplification stage is configured to receive a differential input signal and to produce a single ended first output signal responsive to and indicative of the differential input signal. The second amplification stage is connected in parallel with the first stage and configured to receive the differential input signal and to produce a single ended second output signal responsive to the differential input signal. The third amplification stage is configured to receive the first and second output signals and to produce a single ended third output signal indicative of the difference in the first and second output signals. In the preferred embodiment, the first amplification stage includes an inhibit circuit suitable for receiving a inhibit control signal. The inhibit circuit is configured to drive the first amplification stage to a standby state if the control signal is in a predetermined "inhibit" state. In one embodiment; the first amplification stage includes first and second series circuits, first and second input circuits, and a current sinking and current sourcing device. The first series circuit includes a first pair of p-channel devices in series between a first rail voltage and a feedback node as well as a first pair of n-channel devices in series between the feedback node and a second rail voltage. The gates of the first pair of p-channel devices are connected to a first amplifier node and the gates of the first pair of n-channel devices are connected to a second amplifier node. The second series circuit includes a second pair of p-channel devices in series between the first rail voltage and the single ended output node of the amplifier circuit and a second pair of n-channel devices in series between the output node and the second rail voltage. The gates of the second pair of p-channel devices are connected to the first amplifier node and the gates of the second pair of n-channel devices are connected to the second amplifier node. The first input circuit includes a first input circuit p-channel device and a first input circuit n-channel device connected in series between a first input circuit node and a second input circuit node. The gates of the first input circuit p-channel device and the first input circuit n-channel device are coupled to receive a first input signal (V1) of the differential input signal. The second input circuit includes a second input circuit p-channel device and a second input circuit n-channel device connected in series between the first input circuit node and the second input circuit node. The gates of the second input circuit p-channel device and the second input circuit n-channel device are coupled to receive a second signal (V2) of the differential input signal. The p-channel current sourcing device is connected between the first rail voltage and the first input circuit node and the gate of the p-channel input circuit control device is connected to the first amplifier node. The n-channel current sinking device is connected between the second input circuit node and the second rail voltage, while the gate of the n-channel input circuit control device is connected to the second amplifier node. In one embodiment the differential receiver circuit further includes an inhibit circuit configured receive an inhibit control signal and to drive the p-channel devices gated to the first amplifier node and the n-channel devices gated to the second amplifier node to cutoff when the inhibit control signal is in a specified inhibit state. The inhibit circuit is preferably further configured to provide a low impedance path between the first amplifier node, the second amplifier node, and the feedback node when the inhibit control signal is in a specified functional state.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
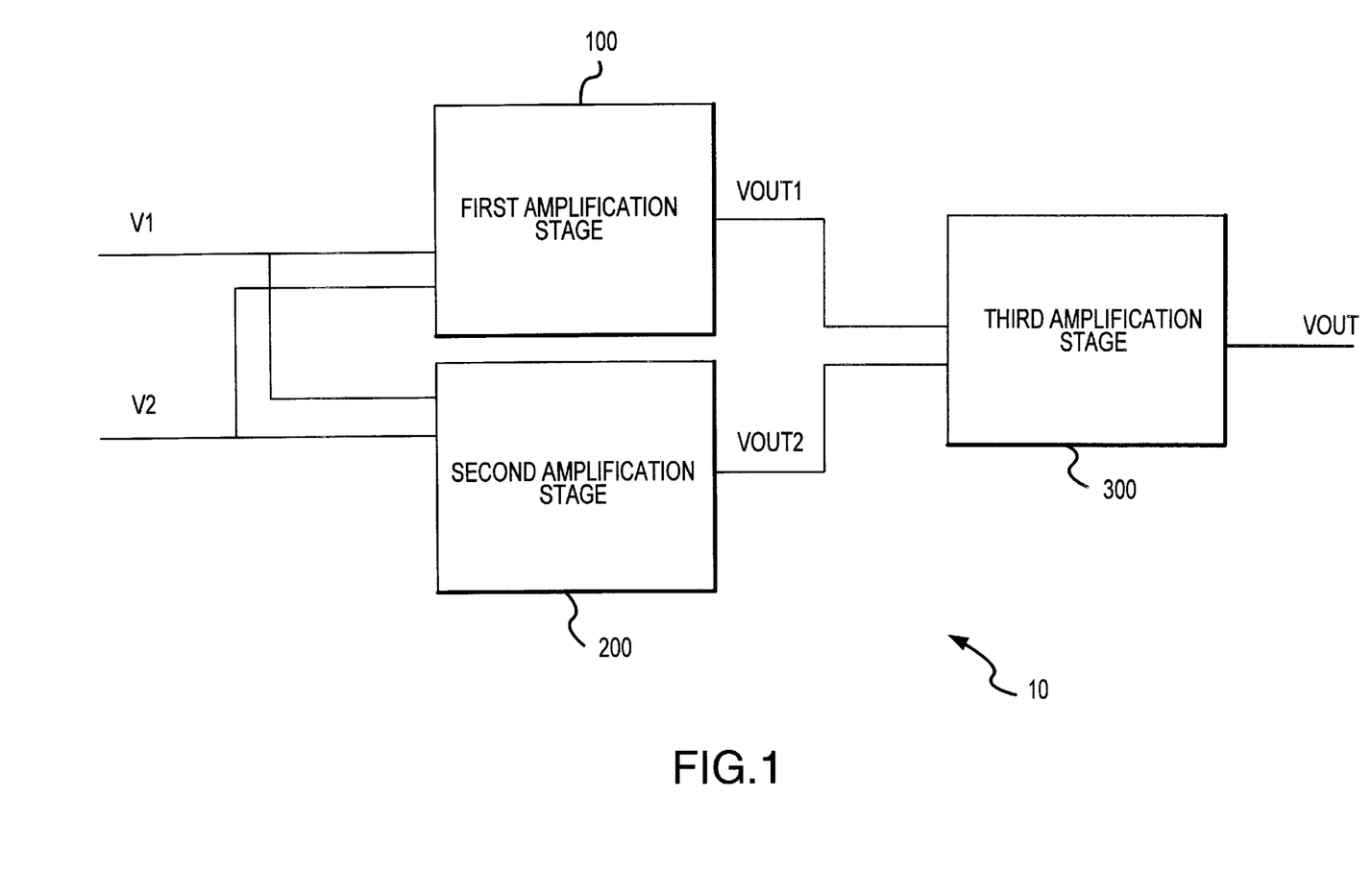
FIG. 1 is a block diagram of a differential receiver circuit according to one embodiment of the present invention.

Turning now to the drawings, FIG. 1 depicts a simplified block diagram of a differential receiver circuit 10 according to one embodiment of the present invention. Differential receiver circuit 10 is suitable for receiving and amplifying a differential signal comprised of a first signal V1 and a second signal V2. Differential receiver circuit 100 is suitable for use in any of a variety of applications in which digital signals are transmitted over a transmission medium from one component of a system to another, particularly if the length of the transmission medium produces significant signal attenuation. Signal attenuation phenomenon including capacitive losses and resistive losses such as skin effect losses are well known in the field of signal transmission and communication systems. As a rule of thumb, transmitting information using a differential signal is appropriate when the characteristics of the transmission system such as the length and composition of the transmission medium and the frequency of the data result in a loss of roughly one third of the original signal strength or more. When signal attenuation is greater than approximately one third, reliable operation cannot be guaranteed with conventional single ended signals.

In the embodiment depicted in FIG. 1, differential receiver circuit 10 includes a first differential amplification stage 100 in parallel with a second amplification stage 200. First and second amplification stages 100 and 200 are both suitably configured to receive input signals V1 and V2. First amplification stage 100 produces a single ended first output signal $V_{OUT1}$ that is indicative of a first difference signal $V_{DIFF1}$ defined as V1−V2. Second amplification stage 200 is designed to produced a single ended second output signal $V_{OUT2}$ that is indicative of a second difference signal $V_{DIFF2}$ defined as V2−V1. Differential receiver circuit 10 further includes a third amplification stage 300 that is cascaded with first and second amplification stages 100 and 200. Third amplification stage 300 is configured to receive first output signal $V_{OUT1}$ and second output signal $V_{OUT2}$ from first and second amplification stage 100 and 200 respectively. Third amplification stage 300 produces a single ended output signal $V_{OUT}$ that is indicative of a third difference signal defined as $V_{OUT1}-V_{OUT2}$. As those knowledgeable in the field of circuit design having the benefit of this disclosure will appreciate, the depicted embodiment of differential receiver circuit 10 contemplates increased immunity to signal jitter, level shifting, and phase lagging in exchange for a relatively modest increase in transmission delay introduced by the cascaded third amplification 300. In embodiments of differential receiver circuit 10 for use in computer systems or other data storage systems, where the progression is consistently towards systems with lower voltage levels and higher data rates, differential receiver circuit 10 ensures the reliable operation of the system using an inexpensive circuit without an appreciable loss in performance.

Figure 2:
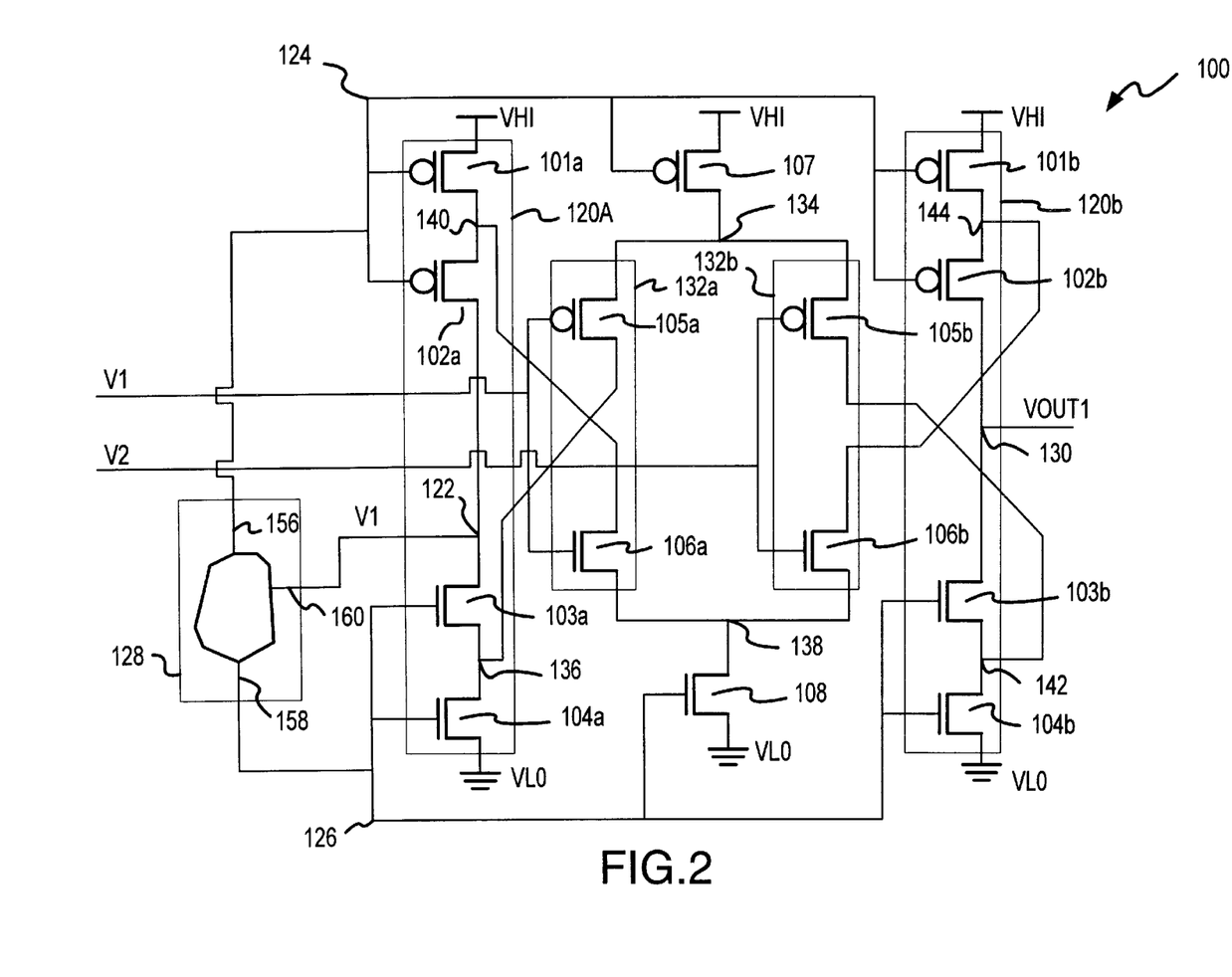
FIG. 2 is a schematic of an amplification stage of the receiver circuit of FIG. 1 according to one embodiment of the present invention.

Turning now to FIG. 2, an embodiment of first amplification stage 100 is shown in greater detail. In the depicted embodiment, first amplification stage 100 includes a first series circuit 120a connected between a first rail voltage, $V_{HI}$, and a second real voltage, $V_{LO}$. In one embodiment, first rail voltage, $V_{HI}$, supplies the system's $V_{DD}$ voltage while second rail voltage, $V_{LO}$, supplies the system ground $V_{SS}$. First series circuit 120a includes a pair of p-channel devices 101a and 102a in series between $V_{HI}$ and a feedback node 122 that is indicated by the voltage $V_F$ at feedback node 122. First series circuit 120a further includes a pair of n-channel devices 103a and 104a connected in series between feedback node 122 and $V_{LO}$. The gates of the first pair of p-channel devices 101a and 102a are tied together at first amplifier node 124 while the first pair of n-channel devices are connected at second amplifier node 126. In the depicted embodiment, first and second nodes 124 and 126 are connected to the first and second outputs 156 and 158 respectively of inhibit circuit 128 as discussed in greater detail below. In another embodiment (not depicted) in which inhibit circuit 128 is eliminated, first amplifier node 124, second amplifier node 126, and feedback node 122 are connected together such that the feedback voltage $V_F$ is supplied to the gates of each of the devices in first series circuit 120a.

First amplification circuit 100 further includes a second series circuit 120b including a second pair of p-channel devices 101b and 102b connected in series between the first rail voltage $V_{HI}$ and an output node 130 denoted by its corresponding voltage $V_{OUT1}$. Second series circuit 120b further includes a second pair of n-channel devices 103b and 104b connected in series between output node 130 and the second rail voltage $V_{LO}$. The gates of the second pair of p-channel devices 101b and 102b are connected to first amplifier node 124 while the gates of the second pair of n-channel devices 103b and 104b are tied to second amplifier node 126. First amplification circuit 100 further includes a first input circuit 132a driven by first input signal V1 and a second input circuit 132b driven by second input signal V2. First input circuit 132a includes a first input circuit p-channel device 105a and a first input circuit n-channel device 106a. Similarly, second input circuit 132b includes a second input circuit p-channel device 105b and a second input circuit n-channel device 106b. The source terminal of p-channel device 105a is connected to a first input circuit node 134 while the drain is connected to the node 136 at the junction of the first pair of n-channel devices 103a and 104a of first series circuit 120a. The source of n-channel device 106a is connected to a second input circuit node 138 while the drain is connected to the node 140 at the junction of the first pair of n-channel devices 101a and 102a. The gates of p-channel device 105a and n-channel device 106a are both connected to first signal V1. The p-channel device 105b of second input circuit 132b is connected between first input circuit node 134 and the node 142 at the junction of the second pair of n-channel devices in second series circuit 120b. The n-channel device 106b of second input circuit 132b is connected in series between second input circuit node 138 and the node 144 at the junction of the second pair of p-channel devices of second series circuit 120b. A p-channel current sourcing device 107 is connected between the first rail voltage $V_{HI}$ and first input circuit node 134 with its gate connected to first amplifier node 124 and an n-channel current sinking device 108 is connected between second input circuit node 138 and the second rail voltage $V_{LO}$ with its gate connected to second amplifier node 126.

From a qualitative perspective, first amplification circuit 100 provides amplification of the difference between V1 and V2 while substantially rejecting the common mode voltage (V1+V2)/2. Amplification of the common mode voltage is suppressed through the operation of the negative feedback provided by the connection between feedback node 122 and first and second nodes 124 and 126 respectively. The negative feedback attenuates changes in the common mode voltage thereby tending to maintain feedback node 122 at the $V_F$ voltage level. If, however, V1 is raised above V2, the difference (V1−V2) is amplified at output node 130 through dual paths. First, p-channel device 105b of second input circuit 132b will conduct more current into node 142. To accommodate this increase in current, the source voltage at node 142 rises to reduce the drain current of n-channel device 103b and maintain an essentially constant current through n-channel device 104b. Conversely, the relative drop in V2 causes a decrease in the drain current of n-channel device 106b thereby requiring a greater current in p-channel device 102b that is accommodated by a rise in the voltage level at node 144. The combination of the rise in voltage at node 144 and node translates into a rise in voltage at output node 130. If V2 drops relative to V1, an opposite shift in voltage at output node 130 occurs. Additional details regarding the quantitative operation of single stage differential amplification circuits is available in M. Bazes, Two Novel Fully Complementary Self-Biased CMOS Differential Amplifiers, IEEE J. of Solid State Circuits, Vol. 26, No. 2, February 1991.

As mentioned previously one embodiment of the invention contemplates that feedback node 122 is connected directly to first amplifier node 124 and second amplifier node 126 such that the gate terminals of each device in first and second series circuits 120a and 120b as well as the gate terminals for current sourcing and current sinking devices 107 and 108 are shorted together. While this embodiment is fully functional as a differential amplifier, another embodiment contemplates, the introduction of an inhibit circuit 128 for providing a mechanism to substantially turn off first amplification stage circuit 100. If it is assumed that first amplification stage 100 is designed such that first amplifier node 124 and second amplifier node 126 are maintained at appropriate voltage levels for enabling their corresponding devices to conduct, it will be apprecaited that, for any common mode voltage between first rail voltage $V_{HI}$ and second rail voltage $V_{LO}$, there is a conductive path in first amplifier circuit 100 that consumes current. For common mode voltage less than the threshold voltages of the n-channel devices in first and second input circuits 132a and 132b, the p-channel devices 105a and 150b are in a conductive state. For common mode voltages greater than the threshold voltage of the p-channel devices 105a and 105b, the n-channel devices 106a and 106b are conductive. For common mode voltages between these two extremes, n-channel devices 106a and 106b as well as p-channel devices 105a and 105b are conductive. Typically, however, it is highly desirable to provide the capability for substantially turning off the current consumed by first amplifier circuit 100, such as when the device or system to which differential receiver circuit 100 is connected is in a standby mode. To reduce the standby current consumed by first amplification circuit 100, inhibit circuit 128 is implemented in one embodiment of the invention.

Figure 3:
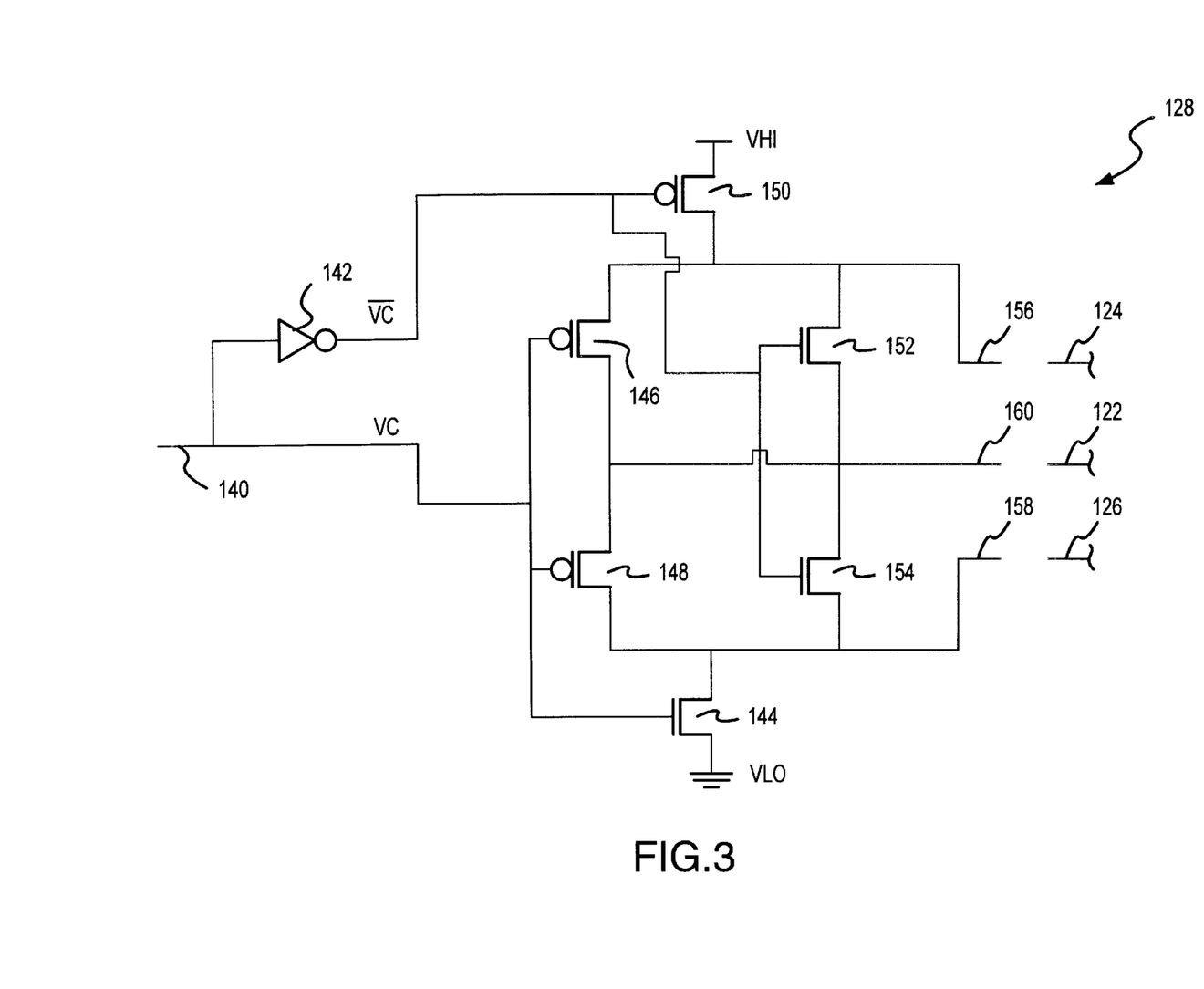
FIG. 3 is a schematic of an inhibit circuit suitable for use with the amplification stage of FIG. 2.

Turning now to FIG. 3, an inhibit circuit 128 according to one embodiment of the invention is depicted for use with first amplifier circuit 100. In the depicted embodiment, includes a control node 140 to which a control voltage $V_C$ is applied. Control node 140 drives the gates of a pair of p-channel devices 146 and 148 that are serially connected between a first output node 156 and a second output node 158 of inhibit circuit 128. Control node 140 further drives the gate of an n-channel device 144 that is coupled between second output node 158 and ground. Control node 140 is further connected to an inverter 142 thereby producing a voltage $\overline{VC}$ that drives the gates of a pair of n-channel devices 152 and 154 serially connected between first output 156 and second output 158 as well as the gate of a p-channel device connected between $V_{DD}$ and first output amplifier node 124. A third output node 160 of inhibit circuit 128 connects the junction of p-channel devices 146 and 148 to the junction of the n-channel devices 152 and 154. In the preferred embodiment, it is contemplated that first output node 156 is connected to first amplifier node 124 of first amplification circuit 100, second output amplifier node 126 is connected to second amplifier node 126 and third output 160 connected to feedback node 122. The control voltage $V_C$ for inhibit circuit 128 may itself comprise the output of a multiple input logic circuit such that one or more signals may combine to control the operation of inhibit circuit 128. During functional operation, control signal $V_C$ is driven to $V_{LO}$ thereby forcing $\overline{VC}$ to $V_{HI}$. With $V_C$ at $V_{LO}$, n-channel device 144 is cut-off while p-channel devices 146 and 148 are in a conductive state. Similarly, with $\overline{VC}$ at $V_{HI}$, p-channel device 150 is cut-off and n-channel devices 152 and 154 are in a conductive state. When inhibit circuit 158 is in this state, it will be appreciated that first inhibit output 156, second inhibit output 158, and third inhibit output 160 of inhibit circuit 128 are virtually shorted together by the low impedance source-drain paths of devices 146, 148, 152, and 154. Thus, during functional operation with $V_C$ at $V_{SS}$ and $\overline{VC}$ at $V_{DD}$, first amplifier node 124, second amplifier node 126, and feedback node 122 are connected together by a low impedance path that approximates the short circuit desirable for the negative feedback mechanism of first amplification circuit 100 described previously.

When control voltage $\overline{VC}$ is driven to $V_{HI}$ and $\overline{VC}$ to $V_{LO}$, p-channel device 150 and n-channel device are turned on thereby effectively shunting first output 156 and second output 154 to $V_{DD}$ and $V_{SS}$ respectively. With inhibit circuit first output 156 connected to amplification circuit first amplifier node 124 and inhibit circuit second output 158 connected to amplification circuit second amplifier node 126, p-channel devices 101a, 101b, 107 of first amplification stage 100, as well as n-channel devices 104a, 104b, and 108 are all driven to cut off thereby eliminating any conductive path through which current can flow and, consequently, forcing a condition in first amplification stage 100 in which the only current flow is due to leakage current thereby reducing the standby current to virtually zero. Thus, inhibit circuit 128 simultaneously facilitates the low impedance feedback mechanism of amplification circuit 100 during functional operation while providing a method of forcing a low current standby mode. Moreover, the capability for forcing the amplification standby current to zero is achieved in inhibit circuit 100 without increasing the stack height of amplification circuit 100 (i.e., the number of devices traversed in the shortest path from $V_{HI}$ to $V_{LO}$). As supply voltages are decreased in an ongoing effort to reduce power consumption and increase performance, stack height becomes a significant constraint because the threshold voltages of deep submicron devices do not scale linearly with channel length and other critical dimensions of the devices. If a power supply voltage of, for example, 1.1V is implemented in a technology where the n-channel threshold voltage $V_t$ is approximately 0.5 volts, it will be appreciated that no more than four devices can be stacked between $V_{DD}$ and $V_{SS}$. Inhibit circuit 128, by not imposing additional stack height on amplification circuit 100, addresses this concern while simultaneously providing a significant benefit in the ability to transition amplification circuit 100 to an extremely low current consumption state when desirable.

Returning now to FIG. 1, the design of differential receiver 10 utilizing multiple amplification circuits is discussed. In one embodiment, first amplification stage 100, second amplification stage 200, and third amplification stage 300 each comprise a circuit equivalent to the embodiment of first amplification stage 100 described previously in reference to FIG. 2. In this embodiment of differential receiver 10, the input signals V1 and V2 are reversed in second amplification circuit 200 such that the V1 input signal drives the second input circuit 132b of second amplification stage 200 while the V2 input signal drives the first input circuit 132a. By reversing the orientation of the inputs in second amplification stage 200, the parallel combination of first amplification stage 100 and second amplification stage 200 compensates for any asymmetries inherent in the amplification stages that might arise from, for example, mismatch of the effective channel lengths or saturated drain currents of the p-channel and n-channel devices in each amplification circuit. The inclusion of a third amplification stage 300 cascaded with the parallel first and second amplification stages improves the differential gain of differential receiver 10 thereby reducing uncertainty in the timing of $V_{OUT}$ transitions. In a conventional single stage differential receiver circuit, for example, transitions between a logical "1" state and a logical "0" state at $V_{OUT}$ might be skewed by as much as 80 to 100 ps due to such factors as the inevitable mismatch in the transmission media carrying V1 and V2. If the pulse width is on the order of 1 ns, it will be appreciated that the variability in the transition edge represents a significant portion of the cycle time. By comparison, incorporating the cascaded stage of the present invention can reduce the variability in $V_{OUT}$ transitions to approximately 10–15 ps. This represents a significant achievement in the context of prevalent systems in which 500 MHz signals are encountered with increasing frequency. The delay introduced by the cascaded third amplification stage 300 (roughly on the order of 250 ps) is relatively insignificant in comparison to the delay introduced by the transmission medium itself. Estimating the delay introduced by conventional copper cabling at approximately 70 ps/cm, it will be appreciated that the transmission delay becomes the primary delay component of the system for a cable of any appreciable length. In one embodiment, each of the amplification stages 100, 200, and 300 may include an inhibit circuit such as inhibit circuit 128 shown and described with respect to FIG. 3. Each of these inhibit circuits may be driven by a common control signal such that a single signal is sufficient to place the entire receiver circuit 10 in a low current standby mode.

Figure 4:
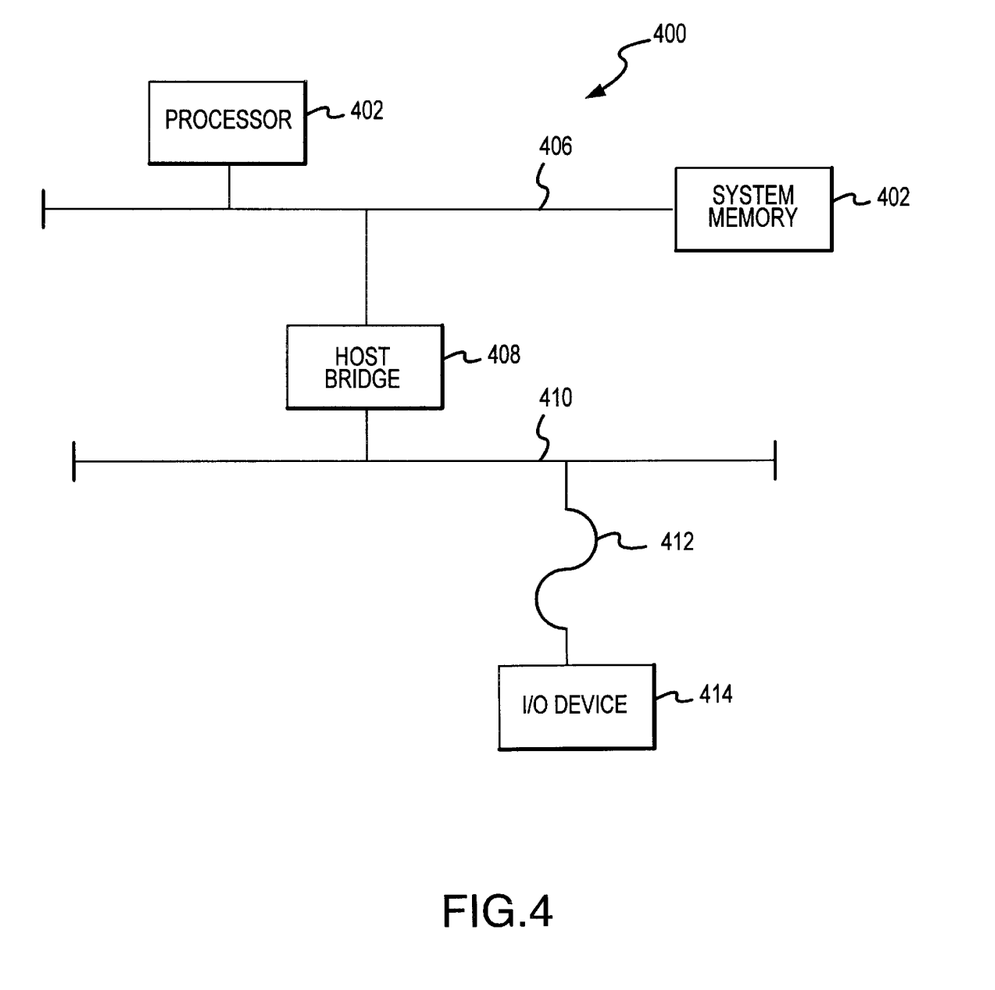
FIG. 4 is a simplified block diagram of a data processing system including an I/O device incorporating the differential receiver circuit of FIG. 1 according to the present invention.

Turning now to FIG. 4, a simplified block diagram of a data processing system 400 according to one embodiment of the present invention is presented. System 400 includes one or more processors 402 coupled to a system memory 404 via a host or system bus 406. Processor (or processors) 400 may comprise processors from any of a variety of microprocessor families including the IBM RS/6000 family of processors, the Motorola 68000 family of processors, as well as the Intel x86 family of processors and the present invention is not intended to require or impose any specific implementation. In the preferred embodiment, system 400 includes a host bridge 408 that may or may not be integrated within processors 402. Host bridge 408 provides for suitable interaction between devices on host bus 406 such as processors 402 and an I/O bus 410. I/O bus 410 preferably complies with any of a variety of industry standard bus architectures including as examples the PCI, AGP, MCA, EISA, and ISA bus architectures. In one exemplary embodiment, I/O bus 410 is compliant with the PCI local bus specification v2.2 and may comply with PCI-X Addendum 1.0 to the local bus specification, both available from the PCI Special Interest Group, 2575 NE Kathryn St #17, Hillsboro, Oreg. 97124 (web site: www.pcisig.com). In one embodiment (not shown), multiple instances of I/O bus 410 are provided by chaining one or more bridges, such as PCI-to-PCI bridges. An embodiment most suitable for benefiting from the advantages provided by the present invention, an I/O device 414 communicates with I/O bus 410 over a transmission medium 412. Transmission medium 412 may comprise conventional twisted pair copper cabling, coaxial cabling, fiber optics cabling or other suitable medium for high speed data transmission. Devices or components representative of I/O device 414 include a controller for a hard disk or a redundant array of independent disks (RAID) system. For additional information on RAID systems, the reader is referred to *The RAID Book, 6th Ed.* available from the RAID Advisory Board at www.raid-advisory.com. These devices may implemented as SCSI compliant devices that communicate with I/O bus 410 via an adapter such as a PCI-to-SCSI adapter (not shown in FIG. 4). Regardless of the implementation details, I/O device 414 includes a differential receiver circuit such as receiver circuit 10 depicted in FIG. 1 and described above. The inclusion of receiver circuit 10 in I/O device 414 improves the ability of I/O device 414 to reliably exchange information with host bus 406 over a relatively long and potentially "lossive" transmission medium 412 with significantly increased the overall transmission delay utilizing an inexpensive and relatively easily manufactured circuit.

It will be apparent to those skilled in the art having the benefit of this disclosure that the present invention contemplates an improved differential receiver circuit. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A differential receiver circuit, comprising:
   a first amplification stage configured to receive a differential input signal and to produce a single ended first output signal responsive to the differential input signal;
   a second amplification stage in parallel with the first stage and configured to receive the inverse of the differential input signal and to produce a second output signal responsive to the differential input signal; and
   a third amplification stage configured to receive the first and second output signals and to produce a single ended third output signal based on the difference between the first and second output signals.

2. The differential receiver circuit of claim 1, wherein the first amplification stage includes an inhibit circuit suitable for receiving a inhibit control signal and configured wherein the inhibit circuit comprises a virtual short circuit when the inhibit control signal is in a first state and wherein the inhibit circuit eliminates any conductive path in the first amplification stage when the inhibit control signal is in a second state.

3. The differential receiver circuit of claim 1, wherein the first amplification stage includes;
   a first series circuit including a first pair of p-channel devices in series between a first rail voltage and a feedback node and a first pair of n-channel devices in series between the feedback node and a second rail voltage, wherein the gates of the first pair of p-channel devices are connected to a first amplifier node and the gates of the first pair of n-channel devices are connected to a second amplifier node;

a second series circuit including a second pair of p-channel devices in series between the first rail voltage and the output signal and a second pair of n-channel devices in series between the output signal and the second rail voltage, wherein the gates of the second pair of p-channel devices are connected to the first amplifier node and the gates of the second pair of n-channel devices are connected to the second amplifier node;

a first input circuit comprising a first input circuit p-channel device and a first input circuit n-channel device connected in series between a first input circuit node and a second input circuit node, wherein the gates of the first input circuit p-channel device and the first input circuit n-channel device are coupled to receive a first signal of the differential input signal;

a second input circuit comprising a second input circuit p-channel device and a second input circuit n-channel device connected in series between the first input circuit node and the second input circuit node, wherein the gates of the second input circuit p-channel device and the second input circuit n-channel device are coupled to receive a second signal of the differential input signal;

a p-channel current sourcing device connected between the first rail voltage and the first input circuit node, wherein the gate of the p-channel input circuit control device is connected to the first amplifier node; and an n-channel current sinking device connected between the second input circuit node and the second rail voltage, wherein the gate of the n-channel input circuit control device is connected to the second amplifier node.

4. The differential receiver circuit of claim 3, further comprising an inhibit circuit configured receive an inhibit control signal and to drive the p-channel devices gated to the first amplifier node and the n-channel devices gated to the second amplifier node to cutoff when the inhibit control signal is in a specified inhibit state.

5. The differential receiver circuit of claim 4, wherein the inhibit circuit is further configured to provide a low impedance path between the first amplifier node, the second amplifier node, and the feedback node when the inhibit control signal is in a specified functional state.

6. The differential receiver circuit of claim 4, wherein the inhibit control circuit includes;

a pair of p-channel devices connected in series between a first output node and a second output node, wherein the gates of the pair of p-channel devices are driven by a control voltage signal ($V_c$);

a pair of n-channel devices coupled in series between the first output node and the second output node, wherein the gates of the pair of n-channel devices are driven by the output of an inverter configured to receive the $V_C$ control voltage signal;

a pull-up, p channel device connected between $V_{DD}$ and the first output node, wherein the gate of the pull-up p-channel device is driven by the output of the inverter;

a pull-down, n-channel device connect between $V_{SS}$ and the second output node, wherein the gate of the pull-down n-channel device is driven by $V_C$; and wherein the junction of the pair of serially connected p-channel devices an the junction of the serially connected n-channel devices are shorted to a third output node of the inhibit circuit.

7. The differential receiver circuit of claim 3, wherein the first amplifier node, the second amplifier node, and the feedback node are shorted together.

8. A data processing system, comprising:

at least one processor coupled to a host bus, a system memory accessible to the at least one processor via the system bus;

a host bridge coupled between the host bus and an I/O bus;

an I/O device connected to the I/O bus via a transmission medium, wherein the I/O device includes a differential receiver circuit suitable for receiving a differential input signal comprising:

a first amplification stage configured to receive the differential input signal and to produce a single ended first output signal responsive to the differential input signal;

a second amplification stage in parallel with the first stage and configured to receive the inverse of the differential input signal and to produce a second output signal responsive to the differential input signal; and a third amplification stage configured to receive the first and second output signals and to produce a single ended third output signal based on the difference between the first and second output signals.

9. The data processing system of claim 8, wherein the first amplification stage includes an inhibit circuit suitable for receiving a inhibit control signal and configured wherein the inhibit circuit comprises a virtual short circuit when the inhibit control signal is in a first state and wherein the inhibit circuit eliminates any conductive path in the first amplification stage when the inhibit control signal is in a second state.

10. The data processing system of claim 8, wherein the first amplification stage includes;

a first series circuit including a first pair of p-channel devices in series between a first rail voltage and a feedback node and a first pair of n-channel devices in series between the feedback node and a second rail voltage, wherein the gates of the first pair of p-channel devices are connected to a first amplifier node and the gates of the first pair of n-channel devices are connected to a second amplifier node;

a second series circuit including a second pair of p-channel devices in series between the first rail voltage and the output signal and a second pair of n-channel devices in series between the output signal and the second rail voltage, wherein.the gates of the second pair of p-channel devices are connected to the first amplifier node and the gates of the second pair of n-channel devices are connected to the second amplifier node;

a first input circuit comprising a first input circuit p-channel device and a first input circuit n-channel device connected in series between a first input circuit node and a second input circuit node, wherein the gates of the first input circuit p-channel device and the first input circuit n-channel device are coupled to receive a first signal of the differential input signal;

a second input circuit comprising a second input circuit p-channel device and a second input circuit n-channel device connected in series between the first input circuit node and the second input circuit node, wherein the gates of the second input circuit p-channel device and the second input circuit n-channel device are coupled to receive a second signal of the differential input signal;

a p-channel current sourcing device connected between the first rail voltage and the first input circuit node, wherein the gate of the p-channel input circuit control device is connected to the first amplifier node; and an n-channel current sinking device connected between the second input circuit node and the second rail voltage, wherein the gate of the n-channel input circuit control device is connected to the second amplifier node.

11. The data processing system of claim 8, further comprising an inhibit circuit configured receive an inhibit control signal and to drive the p-channel devices gated to the first amplifier node and the n-channel devices gated to the second amplifier node to cutoff when the inhibit control signal is in a specified inhibit state.

12. The data processing system of claim 11, wherein the inhibit circuit is further configured to provide a low impedance path between the first amplifier node, the second amplifier node, and the feedback node when the inhibit control signal is in a specified functional state.

13. The data processing system of claim 11, wherein the inhibit control circuit includes;

a pair of p-channel devices connected in series between a first output node and a second output node, wherein the gates of the pair of p-channel devices are driven by a control voltage signal ($V_c$);

a pair of n-channel devices coupled in series between the first output node and the second output node, wherein the gates of the pair of n-channel devices are driven by the output of an inverter configured to receive the $V_C$ control voltage signal;

a pull-up, p channel device connected between $V_{DD}$ and the first output node, wherein the gate of the pull-up p-channel device is driven by the output of the inverter;

a pull-down, n-channel device connect between $V_{SS}$ and the second output node, wherein the gate of the pull-down n-channel device is driven by $V_C$; and wherein the junction of the pair of serially connected p-channel devices an the junction of the serially connected n-channel devices are shorted to a third output node of the inhibit circuit.

14. The data processing system of claim 8, wherein the I/O device comprises a RAID controller.

15. An I/O device including a bus interface unit for communicating with an I/O bus of a data processing system, wherein the I/O device includes a differential receiver circuit suitable for receiving a differential input signal comprising:

a first amplification stage configured to receive the differential input signal and to produce a single ended first output signal responsive to the differential input signal;

a second amplification stage in parallel with the first stage and configured to receive the inverse of the differential input signal and to produce a second output signal responsive to the differential input signal; and a third amplification stage configured to receive the first and second output signals and to produce a single ended third output signal based on the difference between the first and second output signals.

16. The I/O device of claim 15, wherein the first amplification stage includes an inhibit circuit suitable for receiving a inhibit control signal and configured wherein the inhibit circuit comprises a virtual short circuit when the inhibit control signal is in a first state and wherein the inhibit circuit eliminates any conductive path in the first amplification stage when the inhibit control signal is in a second state.

17. The I/O device of claim 15, wherein the first amplification stage includes;

a first series circuit including a first pair of p-channel devices in series between a first rail voltage and a feedback node and a first pair of n-channel devices in series between the feedback node and a second rail voltage, wherein the gates of the first pair of p-channel devices are connected to a first amplifier node and the gates of the first pair of n-channel devices are connected to a second amplifier node;

a second series circuit including a second pair of p-channel devices in series between the first rail voltage and the output signal and a second pair of n-channel devices in series between the output signal and the second rail voltage, wherein the gates of the second pair of p-channel devices are connected to the first amplifier node and the gates of the second pair of n-channel devices are connected to the second amplifier node;

a first input circuit comprising a first input circuit p-channel device and a first input circuit n-channel device connected in series between a first input circuit node and a second input circuit node, wherein the gates of the first input circuit p-channel device and the first input circuit n-channel device are coupled to receive a first signal of the differential input signal;

a second input circuit comprising a second input circuit p-channel device and a second input circuit n-channel device connected in series between the first input circuit node and the second input circuit node, wherein the gates of the second input circuit p-channel device and the second input circuit n-channel device are coupled to receive a second signal of the differential input signal;

a p-channel current sourcing device connected between the first rail voltage and the first input circuit node, wherein the gate of the p-channel input circuit control device is connected to the first amplifier node; and an n-channel current sinking device connected between the second input circuit node and the second rail voltage, wherein the gate of the n-channel input circuit control device is connected to the second amplifier node.

18. The I/O device of claim 17, further comprising an inhibit circuit configured receive an inhibit control signal and to drive the p-channel devices gated to the first amplifier node and the n-channel devices gated to the second amplifier node to cutoff when the inhibit control signal is in a specified inhibit state.

19. The I/O device of claim 18, wherein the inhibit circuit is further configured to provide a low impedance path between the first amplifier node, the second amplifier node, and the feedback node when the inhibit control signal is in a specified functional state.

20. The I/O device of claim 18, wherein the inhibit control circuit includes;
- a pair of p-channel devices connected in series between a first output node and a second output node, wherein the gates of the pair of p-channel devices are driven by a control voltage signal ($V_c$);
- a pair of n-channel devices coupled in series between the first output node and the second output node, wherein the gates of the pair of n-channel devices are driven by the output of an inverter configured to receive the $V_C$ control voltage signal;
- a pull-up, p channel device connected between $V_{DD}$ and the first output node, wherein the gate of the pull-up p-channel device is driven by the output of the inverter;
- a pull-down, n-channel device connect between $V_{SS}$ and the second output node, wherein the gate of the pull-down n-channel device is driven by $V_C$; and
- wherein the junction of the pair of serially connected p-channel devices an the junction of the serially connected n-channel devices are shorted to a third output node of the inhibit circuit.

21. The I/O device of claim 15, wherein the I/O device comprises a RAID controller.

* * * * *